(12) United States Patent
Xiong et al.

(10) Patent No.: US 10,991,113 B2
(45) Date of Patent: Apr. 27, 2021

(54) GYROSCOPE-BASED SYSTEM AND METHOD FOR ASSISTING IN TRACKING HEAT SOURCE ON MECHANICAL ARM

(71) Applicants: CENTRAL SOUTH UNIVERSITY, Changsha (CN); THE SECOND XIANGYA HOSPITAL OF CENTRAL SOUTH UNIVERSITY, Changsha (CN)

(72) Inventors: Li Xiong, Changsha (CN); Siyuan Tang, Changsha (CN); Jingjing Jiao, Changsha (CN); Jiangjie Zhang, Changsha (CN)

(73) Assignees: CENTRAL SOUTH UNIVERSITY, Changsha (CN); THE SECOND XIANGYA HOSPITAL OF CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 16/624,487

(22) PCT Filed: Jan. 2, 2019

(86) PCT No.: PCT/CN2019/070113
§ 371 (c)(1),
(2) Date: Dec. 19, 2019

(87) PCT Pub. No.: WO2019/153985
PCT Pub. Date: Aug. 15, 2019

(65) Prior Publication Data
US 2020/0111224 A1   Apr. 9, 2020

(30) Foreign Application Priority Data
Feb. 12, 2018   (CN) .......................... 201810147131.0

(51) Int. Cl.
*G06T 7/579*   (2017.01)
*B25J 9/16*    (2006.01)

(52) U.S. Cl.
CPC ............. *G06T 7/579* (2017.01); *B25J 9/1635* (2013.01); *G06T 2207/10081* (2013.01); *G06T 2207/10088* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 10,032,276 B1 * | 7/2018 | Liu ......................... | G01P 15/18 |
| 10,043,076 B1 * | 8/2018 | Zhang ...................... | G06T 7/74 |

(Continued)

FOREIGN PATENT DOCUMENTS

| | | | |
|---|---|---|---|
| CN | 102601800 A | * | 7/2012 |
| CN | 102601800 A | | 7/2012 |

(Continued)

*Primary Examiner* — Delomia L Gilliard
(74) *Attorney, Agent, or Firm* — Volpe Koenig

(57) ABSTRACT

A gyroscope-based system and method is disclosed. Image information data is collected; a mechanical arm working environment image is modeled; a heat source supply apparatus and a gyroscope are provided at the mechanical arm proximal end; the position of the proximal end is accurately measured by accurately tracking the heat source at the proximal end; the relative position of the mechanical arm distal end is accurately calculated by using high-precision angle information measured by the high-precision gyroscope in combination with a number-theoretic formula. The disclosure provides separately determining the position of the distal end, or for assisting other algorithms or apparatuses that track the position of the mechanical arm distal end in error correction and calibration of the position of the mechanical arm distal end. The position of the mechanical (Continued)

arm distal end can be continuously and dynamically tracked in real time, and virtualized in the corresponding image system.

6 Claims, 2 Drawing Sheets

(56) References Cited

U.S. PATENT DOCUMENTS

| | | | |
|---|---|---|---|
| 10,366,508 B1* | 7/2019 | Liu | G06T 7/74 |
| 10,390,003 B1* | 8/2019 | Liu | G06T 7/246 |
| 10,395,117 B1* | 8/2019 | Zhang | G06K 9/00805 |
| 10,402,663 B1* | 9/2019 | Tsai | G02B 27/0172 |
| 10,410,328 B1* | 9/2019 | Liu | H04N 5/23229 |
| 2014/0229007 A1* | 8/2014 | Kishi | A61B 34/37 700/257 |
| 2016/0127617 A1* | 5/2016 | Partouche | H04N 5/2254 348/207.99 |
| 2018/0286072 A1* | 10/2018 | Tsai | G05D 1/0274 |

FOREIGN PATENT DOCUMENTS

| | | | | |
|---|---|---|---|---|
| CN | 106092053 A | * | 11/2016 | |
| CN | 106092053 A | | 11/2016 | |
| CN | 106840205 A | * | 6/2017 | |
| CN | 106840205 A | | 6/2017 | |
| CN | 108171749 A | * | 6/2018 | B25J 9/1694 |
| CN | 108171749 A | | 6/2018 | |
| TW | 201217123 A | | 5/2012 | |
| WO | 2017098707 A1 | | 6/2017 | |
| WO | WO-2017098707 A1 | * | 6/2017 | B25J 9/08 |

* cited by examiner

GYROSCOPE-BASED SYSTEM AND METHOD FOR ASSISTING IN TRACKING HEAT SOURCE ON MECHANICAL ARM

CROSS REFERENCE TO RELATED APPLICATIONS

This application is a 35 USC § 371 national stage of PCT/CN2019/070113, which was filed Jan. 2, 2019, claims priority to Chinese Application No. 201810147131.0, filed on Feb. 12, 2018, and is entitled "GYROSCOPE-BASED SYSTEM AND METHOD FOR ASSISTING IN TRACKING HEAT SOURCE ON MECHANICAL ARM," both of which are incorporated herein by reference as if fully set forth.

FIELD OF THE INVENTION

The present invention relates to the technical field of mechanical arms, particularly to gyroscope-based system and method for assisting in tracking the heat source on a mechanical arm.

BACKGROUND OF THE INVENTION

Mechanical arms are automatic mechanical devices applied the most widely in the field of robot technology, and can be seen in the fields of industrial manufacturing, medical treatment, entertainment services, military, semiconductor manufacturing and space exploration, etc. Although they are in different morphologies, they have a common feature, i.e., they can accept instructions and accurately position at a point in a three-dimensional (or two-dimensional) space for operation.

Traditionally, most mechanical arms are provided with a signal source marker or sensor at the mechanical arm end. However, the biggest problem in intelligent mechanical arm operable is that the signal source marker or sensor at the mechanical arm end is delicate or fixed. Consequently, it is unable to modify or replace the mechanical arm end.

SUMMARY OF THE INVENTION

In view of the above-mentioned defects in the prior art, the technical problem to be solved in the present invention is to provide gyroscope-based system and method for assisting in tracking the heat source on a mechanical arm to overcome the drawbacks in the prior art.

To attain the object described above, the present invention provides a gyroscope-based system for assisting in tracking the heat source on a mechanical arm, which comprises:

a 3D modeling part: this part collects and analyzes a scan image of a controlled object, performs image enhancement on the image of the controlled object, then compresses and encodes the image, and transmits the image to a PC; then the PC decodes the image to construct a 3D simulation image of the controlled object, and stores the 3D simulation image in the form of three-dimensional data (x, y, z), wherein the transverse axis is defined as y-axis, the longitudinal axis is defined as y-axis, and the vertical axis is defined as z-axis, and, the data of any coordinate point (x, y, z) is the image source data of a part of the controlled object as long as the data is not equal to zero;

a mechanical arm proximal end capture part: two mechanical arm proximal end capture devices can capture a heat source fixed at a mechanical arm proximal end respectively, wherein one heat source capture device acquires ($x2$, $y2$) and the other heat source capture device acquires ($y2$, $z2$), and the two sets of y-axis coordinates can be used for mutual calibration; then a heat source tracking system calculates relative position data ($x2$, $y2$, $z2$) of the mechanism arm proximal end and transmits the data to a digital image processing system part;

an image processing system part: after determining the position of the mechanical arm proximal end according to the coordinates provided by the mechanical arm proximal end capture part, this part acquires real-time gyroscope data at the same time, calculates the working angle and direction of the mechanical arm according to the three-dimensional angle information acquired by a gyroscope, calculates the relative position ($x1$, $y1$, $z1$) of the mechanical arm distal end according to the relative position ($x2$, $y2$, $z2$) of the mechanical arm proximal end and the three-dimensional angle information of the mechanical arm, then collects plenty of image data for integration, performs image grayscale processing on the image obtained through the integration, and specifically darkens the x-axis position, the y-axis position, and the z-axis position for marking.

Furthermore, the 3D modeling part collects and analyzes a scan image of the controlled object by means of techniques not limited to CT, magnetic resonance, 3D scanning, and X-ray techniques.

Furthermore, the mechanical arm proximal end capture part is mounted at 200 cm at the right side and 200 cm above the top of a working table.

Furthermore, after the relative position ($x1$, $y1$, $z1$) of the mechanical arm distal end is marked on the image in a display system, the image displayed in the display system can be zoomed in/out.

Furthermore, both of the two mechanical arm proximal end capture devices capture the heat source fixed at the mechanical arm proximal end at 50 Hz frequency.

A gyroscope-based method for assisting in tracking heat source on mechanical arm, comprising the following steps:

step 1: collecting and analyzing a scan image of a controlled object, performing image enhancement on the collected image of the controlled object, then compressing and encoding the image, transmitting the image to a PC, and decoding the image to construct a 3D simulation image of the controlled object;

step 2: capturing, by two mechanical arm proximal end capture devices, a heat source fixed at a mechanical arm proximal end at 50 Hz frequency respectively, wherein one heat source capture device acquires ($x2$, $y2$) and the other heat source capture device acquires ($y2$, $z2$), and then calculating relative position data ($x2$, $y2$, $z2$) of the mechanism arm proximal end by a heat source tracking system and transmitting the data to a digital image processing part;

step 3: after determining the position of the mechanical arm proximal end according to the coordinates provided by the mechanical arm proximal end capture part, acquiring real-time gyroscope data, calculating the relative position of the mechanical arm distal end according to three-dimensional angle information acquired by a gyroscope, then collecting plenty of image data for integration, performing image grayscale processing on the image obtained after the integration, and specifically darkening the x-axis position, the y-axis position, and the z-axis position for marking.

The present invention has the following beneficial effects:

In the present invention, techniques such as CT, magnetic resonance, 3D scanning, and X-ray techniques are utilized, plenty of image information data is collected; a working environment image of a mechanical arm is modeled; a heat source supply apparatus and a gyroscope are provided at the mechanical arm proximal end; the position of the mechanical arm proximal end is accurately measured by accurately tracking the heat source at the mechanical arm proximal end; the relative position of the mechanical arm distal end is accurately calculated by using high-precision angle information measured by the high-precision gyroscope in combination with a number-theoretic formula. The present invention is used for separately determining the position of the mechanical arm distal end, or for assisting other algorithms or apparatuses that track the position of the mechanical arm distal end in error correction and calibration of the position of the mechanical arm distal end, so as to ensure the accuracy of the position of the arm distal end displayed in an image processing system. The position of the mechanical arm distal end can be continuously and dynamically tracked in real time, and virtualized in the corresponding image system, thereby the position of the mechanical arm distal end is determined, and an operator or intelligent algorithm is assisted or guided for various fine mechanical operations.

Hereunder the concept, specific structure, and technical effects of the present invention will be further detailed with reference to the accompanying drawings, in order to make the objects, features, and effects of the present invention understood more comprehensively.

DETAILED DESCRIPTION OF THE EMBODIMENTS

Embodiment 1

Figure 1:
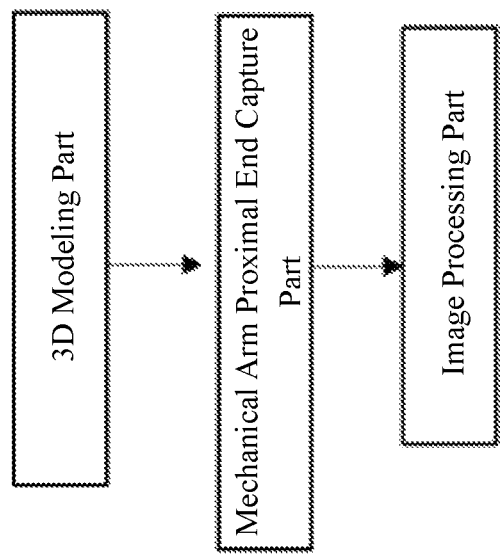
FIG. 1 is a block diagram of the system according to the present invention.
Figure 2:
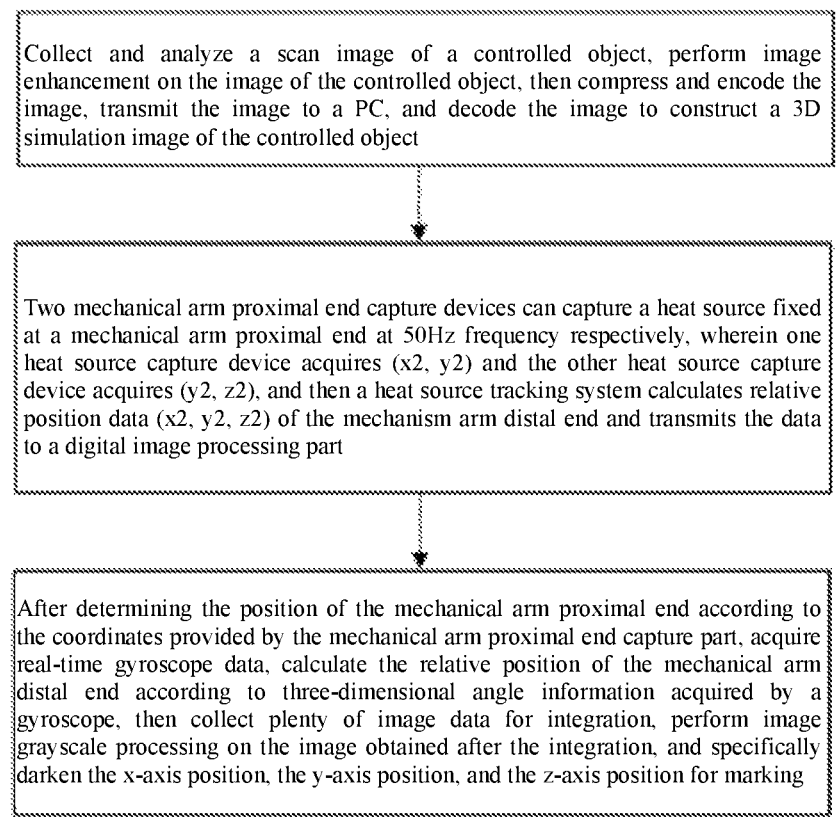
FIG. 2 is a flow chart of the system according to the present invention.

As shown in FIG. 1, a gyroscope-based system for assisting in tracking the heat source on a mechanical arm, comprising:

A. a 3D modeling part that integrates digital image information for 3D modeling: this part collects and analyzes a scan image of a controlled object with techniques such as CT, magnetic resonance, 3D scanning, and X-ray techniques, performs image enhancement on the image of the controlled object, then compresses and encodes the image, and transmits the image to a PC. The decoded image is used to construct a 3D simulation image of the controlled object, and is stored in the form of three-dimensional data (x, y, z), wherein the transverse axis is defined as x-axis, the longitudinal axis is defined as y-axis, and the vertical axis is defined as z-axis, and, the data of any coordinate point (x, y, z) is the image source data of a part of the controlled object as long as the data is not equal to zero.

B. a mechanical arm end capture part: a heat source capture device is mounted at 200 cm at the right side and at 200 cm above the top of a working table respectively, both of the two heat source capture devices can capture a heat source fixed at the mechanical arm proximal end at 50 Hz frequency respectively, wherein one heat source capture device acquires (x2, y2), and the other heat source capture device acquires (y2, z2), and the two sets of y-axis coordinates can be used for mutual calibration; then the heat source tracking system calculates relative position data (x2, y2, z2) of the mechanical arm proximal end, and transmits the data to a digital image processing system.

C. an image processing system part: after determining the position of the mechanical arm proximal end according to the coordinates provided by the mechanical arm proximal end capture part, this part acquires real-time gyroscope data at the same time, calculates the working angle and direction of the mechanical arm accurately according to the three-dimensional angle information acquired by a gyroscope, and calculates the relative position (x1, y1, z1) of the mechanical arm distal end by using number-theoretic formula according to the relative position (x2, y2, z2) of the mechanical arm proximal end and the three-dimensional angle information of the mechanical arm. Then, plenty of image data is acquired with techniques such as CT, magnetic resonance, 3D scanning, and X-ray techniques for integration, carries out image grayscale processing on the integrated image, and specifically darkens the x-axis position, the y-axis position, and the z-axis position for marking, to facilitate the mechanical engineer to quickly and accurately identify the positions. The specific implementation steps are as follows:

Step 1: two heat source capture devices scan a signal heat source at 50 Hz refresh frequency, judge the position of the mechanical arm proximal end according to preset thresholds, and acquire (x2, y2) and (y2, z2), and then determine the coordinates (x2, y2, z2) with comparison calculation formulae in image processing.

Step 2: when the coordinates are known, the relative position (x1, y1, z1) of the mechanical arm distal end is deduced from the known position (x2, y2, z2) of the mechanical arm proximal end with a number-theoretic formula according to three-dimensional angle coordinates acquired by the gyroscope, the data is transmitted to a display processing system of a PC, and the image data is enhanced in the PC.

Step 3: the transmitted relative position (x1, y1, z1) of the mechanical arm distal end is marked on the image in the corresponding display system, and the image displayed in the display system can be zoomed in/out for the convenience of observation.

After the position of the mechanical arm end is determined, mechanical control operations can be performed in a predetermined operation route.

Embodiment 2

The difference from the embodiment 1 is: this system is used as an assisting system. Hence, the relative position (x, y, z) transmitted from another tracking device or system may be acquired first; then, comparing the data (x, y, z) and (x1, y1, z1) positioned and transmitted directly by the signal source for error analysis, and optimized data is selected, then the coordinate point is marked in the image display system. If a next operation is to be performed at the end point, after the operation in the predetermined basic route is completed, the follow-up implementation steps may be executed in the parts B and C in the same way to plan for a new operation route again, and the mechanical operation may be continued from the end point; fine correction may be made according to the matching between the physical controlled object and the information of three-dimensional position of the mechanical arm end in conjunction with the experience of the mechanical engineer, then the next operation is performed.

It should be noted that the controlled object must be fixed before the system is used. The simplest and most practical way to fix the controlled object before the mechanical arm is operated is to fix it to a working table and fasten it with adhesive tape or the like. When the information of image source data is acquired, the system will calibrate the relative positions of the parts of the controlled object, and may make adjustments and corrections to the data source during the operation, to ensure that the system coordinates have no deviation; at the same time, the mechanical engineer may tune some parameters during the use for the convenience of comparison operation. Wherein, the parameters including image size and positioning calibration, etc.

In summary, in the present invention, techniques such as CT, magnetic resonance, 3D scanning, and X-ray techniques are utilized, plenty of image information data is collected; a working environment image of a mechanical arm is modeled; a heat source supply apparatus and a gyroscope are provided at the mechanical arm proximal end; the position of the mechanical arm proximal end is accurately measured by accurately tracking the heat source at the mechanical arm proximal end; the relative position of the mechanical arm distal end is accurately calculated by using high-precision angle information measured by the high-precision gyroscope in combination with a number-theoretic formula. The present invention is used for separately determining the position of the mechanical arm distal end, or for assisting other algorithms or apparatuses that track the position of the mechanical arm distal end in error correction and calibration of the position of the mechanical arm distal end, so as to ensure the accuracy of the position of the arm distal end displayed in an image processing system. The position of the mechanical arm distal end can be continuously and dynamically tracked in real time, and virtualized in the corresponding image system, thereby the position of the mechanical arm distal end is determined, and an operator or intelligent algorithm is assisted or guided for various fine mechanical operations.

While some preferred embodiments of the present invention are described above in detail, it should be understood that the skilled in the art can make various modifications and variations according to the concept of the present invention without any creative labor. Therefore, any technical solution that can be obtained by those skilled in the art through logical analysis, reasoning or a limited number of experiments on the basis of the prior art according to the concept of the present invention shall be deemed as falling in the scope of protection of the present invention as defined by the attached claims.

The invention claimed is:

1. Gyroscope-based system for assisting in tracking heat source on mechanical arm, comprising:
   a three dimensional (3D) modeling part: the 3D modelling part collects and analyzes a scanned image of a controlled object, performs image enhancement on the scanned image of the controlled object, then compresses and encodes the scanned image, and transmits the image to a personal computer(PC); then the PC decodes the scanned image to construct a three dimensional (3D) simulation image of the controlled object, and stores the 3D simulation image in the form of three-dimensional data (x, y, z), wherein the transverse axis is defined as y-axis, the longitudinal axis is defined as y-axis, and the vertical axis is defined as z-axis, and data at any coordinate point (x, y, z) is an image source data of a part of the controlled object and coordinate point (x, y, z) data greater than zero is image source data of a part of the controlled object;
   a mechanical arm proximal end capture part: two mechanical arm proximal end capture devices can capture a heat source fixed at a mechanical arm proximal end respectively, wherein one heat source capture device acquires (x2, y2) and the other heat source capture device acquires (y2, z2), and the two sets of y-axis coordinates can be used for mutual calibration; then a heat source tracking system calculates relative position data (x2, y2, z2) of the mechanism arm proximal end and transmits the data to a digital image processing system part;
   an image processing system part: after determining a position of the mechanical arm end according to the coordinates provided by the mechanical arm proximal end capture part, the image processing system part acquires real-time gyroscope data at the same time, calculates the working angle and direction of the mechanical arm according to the three-dimensional angle information acquired by a gyroscope, calculates a relative position (x1, y1, z1) of the mechanical arm distal end according to the relative position (x2, y2, z2) of the mechanical arm proximal end and the three-dimensional angle information of the mechanical arm, then collects a plurality of image data for integration, performs image grayscale processing on the image data obtained through the integration, and specifically darkens the x-axis position, the y-axis position, and the z-axis position for displaying the x-axis position, the y-axis position, and the z-axis position.

2. The gyroscope-based system for assisting in tracking heat source on mechanical arm according to claim 1, wherein: the 3D modeling part collects and analyzes the scanned image of the controlled object by means of techniques not limited to CT, magnetic resonance, 3D scanning, and X-ray techniques.

3. The gyroscope-based system for assisting in tracking heat source on mechanical arm according to claim 1, wherein: the mechanical arm proximal end capture part is mounted at 200 cm at a right side and 200 cm above a top of a working table.

4. The gyroscope-based system for assisting in tracking heat source on mechanical arm according to claim 1, wherein: after the relative position (x1, y1, z1) of the mechanical arm distal end is marked on the scanned image in a display system, an image displayed in the display system can be zoomed in/out.

5. The gyroscope-based system for assisting in tracking heat source on mechanical arm according to claim 1, wherein: both of the two mechanical arm proximal end capture devices capture the heat source fixed at the mechanical arm proximal end at 50 Hz frequency.

6. A gyroscope-based method for assisting in tracking heat source on mechanical arm, comprising the following steps:
   step 1: collecting and analyzing a scan image of a controlled object, performing image enhancement on the scanned image of the controlled object, then compressing and encoding the scanned image, transmitting the scanned image to a personal computer (PC), and decoding the scanned image to construct a three dimensional (3D) simulation image of the controlled object;
   step 2: capturing, by two mechanical arm proximal end capture devices, a heat source fixed at a mechanical arm proximal end at 50 Hz frequency respectively, wherein one heat source capture device acquires (x2, y2) and the other heat source capture device acquires (y2, z2), and then calculating relative position data (x2, y2, z2) of the mechanism arm proximal end by a heat source tracking system and transmitting the data to a digital image processing part;

step 3: after determining a position of the mechanical arm proximal end according to the coordinates provided by the mechanical arm proximal end capture part, acquiring real-time gyroscope data, calculating a relative position of the mechanical arm distal end according to three-dimensional angle information acquired by a gyroscope, then collecting a plurality of image data for integration, performing image grayscale processing on the image data obtained after the integration, and specifically darkening the x-axis position, the y-axis position, and the z-axis position for displaying the x-axis position, the y-axis position, and the z-axis position.

* * * * *